Figure 1:
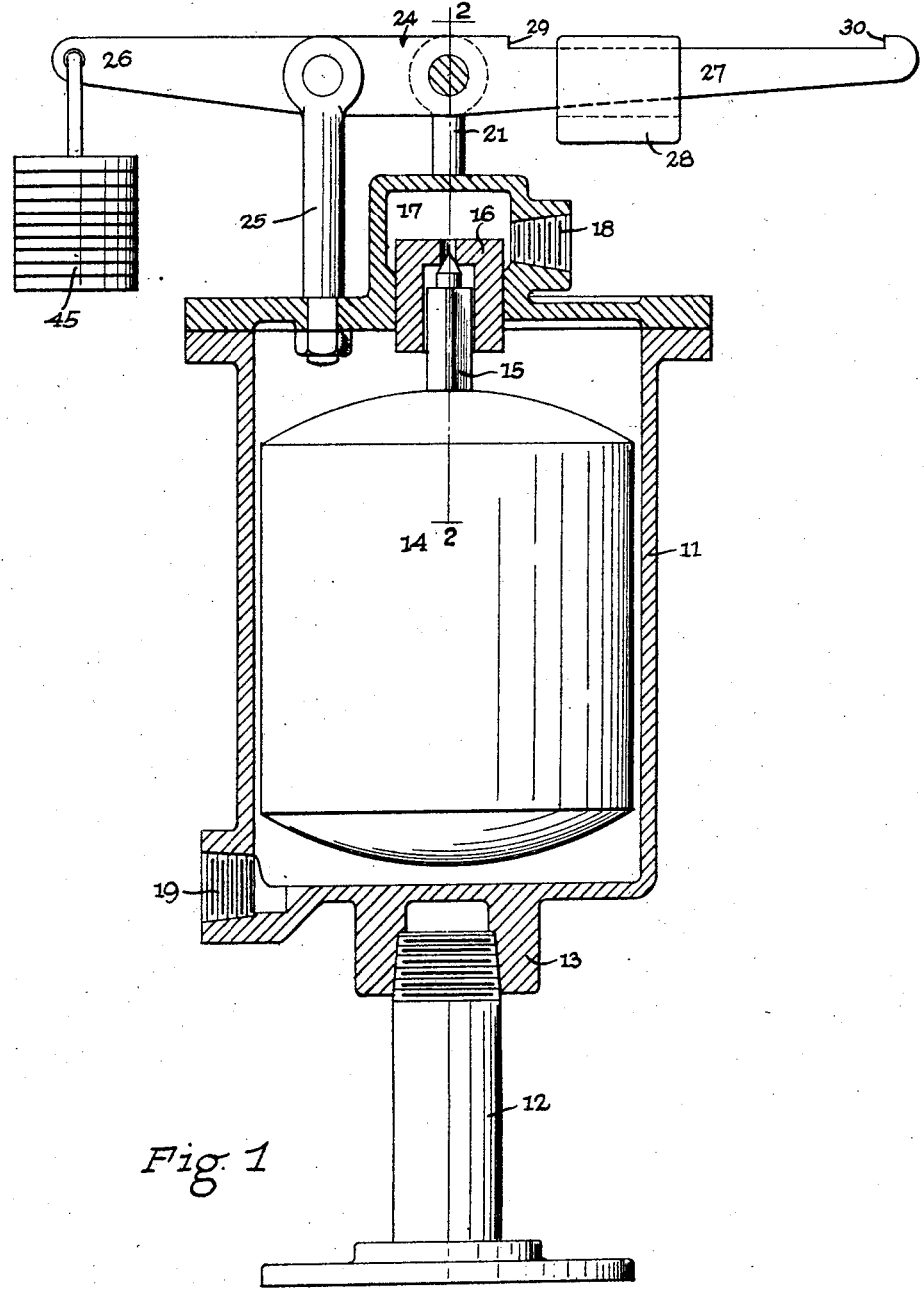

Sept. 28, 1926.
A. E. BEALS
1,601,668
FLOAT ACTUATED OPERATING MECHANISM
Filed July 22, 1925    2 Sheets-Sheet 2
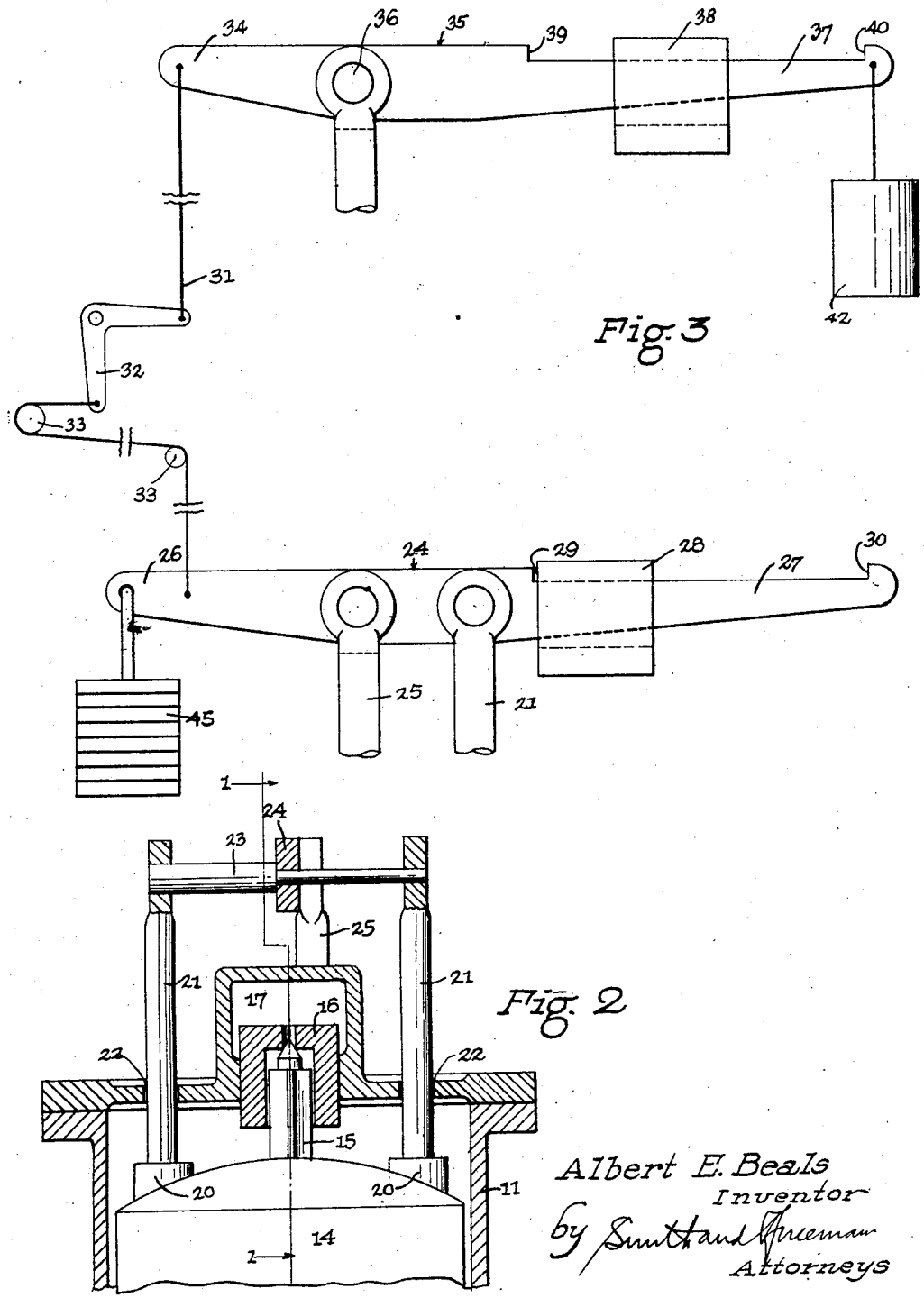

Patented Sept. 28, 1926.

1,601,668

UNITED STATES PATENT OFFICE.

ALBERT E. BEALS, OF LAKEWOOD, OHIO, ASSIGNOR TO HIMSELF AND ROBERT C. McKEIGHAN, OF CLEVELAND, OHIO.

FLOAT-ACTUATED OPERATING MECHANISM.

Application filed July 22, 1925. Serial No. 45,309.

My invention relates to float actuated operating mechanism and the principal object of my invention is to provide a new and improved mechanism of this type. In the drawings accompanying this specification and forming a part thereof I have shown, for purposes of illustration, one form which my invention may assume. In these drawings:—

Figure 1 is a vertical section through this illustrative embodiment of my invention taken on the line 1—1 of Figure 2, Figure 2 is a section on the line 2—2 of Figure 1, while Figure 3 is a partially diagrammatic representation of a remote control system applicable to the device shown in Figures 1 and 2.

The float actuated operating mechanism herein shown comprises a receptacle 11 supported in any suitable manner as by a standard 12 screw-threaded into a boss 13 carried by the bottom of the receptacle. Positioned within the receptacle 11 is a float 14 herein shown as provided with a valve head 15 arranged to close the opening of a cooperating valve seat 16 carried by the top of the receptacle 11 and affording communication between the receptacle 11 and a chamber 17 carried thereon and provided with an opening 18 adapted to receive a suitable inlet duct (not shown). The receptacle 11 is also provided with an aperture 19 adapted to receive a suitable outlet duct (also not shown).

Secured to the float 14 in any suitable manner, as by screw-threading into lugs 20, are a pair of rods 21 extending upwardly through apertures 22 in the top of the receptacle 11 and pivoted at their upper ends to a cross pin 23 carried by a lever 24 which is in turn pivotally mounted on a strut 25 extending through and secured to the top of the receptacle 11. The rear end 26 of the lever 25 may carry a counter-weight 45 to balance to any desired degree the weight of the float 14 and parts bearing thereon while the forward end 27 of the lever 24 carries a weight 28 slidably mounted thereon and arranged to be moved from an inner position abutting a shoulder 29 to an outer position abutting a shoulder 30 and to any desired intermediate position.

It will be obvious from the above description that for any given setting of the weight 28 the float 14 will rise to seat the valve head 15 in the valve seat 16 when the fluid within the receptacle 11 has reached that level at which the weight of the fluid displaced by the immersed portion of the float 14 is equal to the net weight of the float 14 and the parts carried thereby and it will therefore be obvious that for any given setting of the weight 28 the float 14 will maintain a substantially constant level in the receptacle 11 and the system connected thereto through the outlet opening 19. On the other hand, it will also be obvious that each change in position of the weight 28 will change the total net weight of the float 14 and accordingly change the displacement necessary to overcome this weight, so that each such change in position of the weight 28 will cause a corresponding change in the height at which is maintained the fluid in the receptacle 11 and the system connected to the outlet opening 19.

Under certain conditions it is desirable to control the action of the fluid actuated operating mechanism from a point remote from the mechanism itself and in Figure 3 I have shown one method of effecting such control.

The device shown in Figure 3 comprises a cable 31 extending through any desired number of bell cranks 32 and around any desired number of pulleys 33 from the rear end 26 of the lever 24 to the rear end 34 of a lever 35 positioned at the desired point of control, pivotally supported at 36, and provided on its forward end 37 with a weight 38 in all respects similar to the weight 28 and movable between the inner shoulder 39 of the lever 35 and the outer shoulder 40 of this lever 35.

In using this remote control I maintain the cable 31 under tension by increasing the counter-weight 45 applied to the rear end 26 of the lever 24 and applying a balancing counter-weight 42 to the end 37 of the lever 35, lock the weight 28 in a fixed position, and form the weight 38 of a magnitude sufficient to produce the same net weight upon the float 14 previously produced with the cable 31 disconnected and the sliding weight 28 in the position on the lever 24 corresponding to the then position of the weight 38 on the lever 35.

It will be obvious from the above description that I have provided new and improved float actuated operating mechanism operating at any desired predetermined level and effective in conjunction with a controlled valve to maintain fluid in the float receptacle, and in the system controlled thereby, substantially constant at any desired level. It will of course be obvious to those skilled in the art that the particular embodiment of my invention herein shown and described may be applied to additional uses and may be variously changed and modified all without departing from the spirit of my invention or sacrificing the advantages thereof. It will therefore be understood that this disclosure is illustrative only and that my invention is not limited thereto.

I claim:—

1. Float controlled mechanism comprising relatively stationary receptacle means, a valve seat carried thereby, float means operatively positioned therein, a valve head carried by said float means and cooperating with said valve seat, and a lever connected to said float means, in combination with means for varying the fluid level at which said float means operates said valve head comprising a weight adjustable along said lever.

2. Float controlled mechanism comprising relatively stationary receptacle means, float means operatively positioned therein, and means operated by said float means, in combination with adjustable means operable at a point remote from said float controlled mechanism and connected to said float controlled mechanism for varying the fluid level at which said float means operates said float operated means and without varying the resistance to operation of said float operated means.

3. Float controlled mechanism comprising relatively stationary receptacle means, float means operatively positioned therein, means operated by said float means, and a lever connected to said float means, in combination with adjustable means operable at a point remote from said float controlled mechanism and connected to said lever for varying the fluid level at which said float means operates said float operated means by varying the resistance to operation of said lever by said float means.

4. Float controlled mechanism comprising relatively stationary receptacle means, float means operatively positioned therein, and means operated by said float means, in combination with adjustable means operable at a point remote from said float controlled mechanism and connected to said float controlled mechanism for varying the fluid level at which said float means operates said float operated means by varying the ratio between the weight of said float means and the area of said float means.

5. Float controlled mechanism comprising relatively stationary receptacle means, float means operatively positioned therein, and means operated by said float means, in combination with adjustable means operable at a point remote from said float controlled mechanism and connected to said float controlled mechanism for varying the fluid level at which said float means operates said float operated means by varying the effective weight of said float means.

6. Float controlled mechanism comprising relatively stationary receptacle means, float means operatively positioned therein, means operated by said float means, and a lever connected to said float means, in combination with means for varying the fluid level at which said float means operates said float operated means by varying the effective weight applied by said lever to said float means.

7. Float controlled mechanism comprising relatively stationary receptacle means, float means operatively positioned therein, means operated by said float means, and a lever connected to said float means, in combination with means for varying the fluid level at which said float means operates said float operating means by varying the resistance to operation of said lever by said float means.

8. Float controlled mechanism comprising relatively stationary receptacle means, float means operatively positioned therein, and means operated by said float means, in combination with adjustable means operable at a point remote from said float controlled mechanism and connected to said float-controlled mechanism for varying the fluid level at which said float means operates said float operated means by varying the ratio between the resistance to operation of said float means and the horizontal cross-sectional area of said float means.

9. Float controlled mechanism comprising relatively stationary receptacle means, float means operatively positioned therein, means operated by said float means, and a lever connected to said float means, in combination with adjustable means operable at a point remote from said float controlled mechanism and connected to said lever for varying the fluid level at which said float means operates said float operated means by varying the effective weight applied by said lever to said float means.

10. Float controlled mechanism comprising relatively stationary receptacle means, float means operatively positioned therein, and means operated by said float means, in combination with adjustable means operable at a point remote from said float controlled mechanism and connected to said float-controlled mechanism for varying the fluid level at which said float means operates said float operated means by varying the resistance to operation of said float means.

In testimony whereof I hereunto affix my signature.

ALBERT E. BEALS.